(12) United States Patent
Singh et al.

(10) Patent No.: US 9,767,118 B2
(45) Date of Patent: Sep. 19, 2017

(54) OPTIMIZED UEFI FILE SYSTEM WITH NETWORK FILE SYSTEM COMPOUND STATEMENTS

(71) Applicant: Dell Products, LP, Round Rock, TX (US)

(72) Inventors: Ankit Singh, Bangalore (IN); S. Shekar Babu, Bangalore (IN); Sumanth Vidyadhara, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 323 days.

(21) Appl. No.: 14/557,048

(22) Filed: Dec. 1, 2014

(65) Prior Publication Data

US 2016/0154820 A1 Jun. 2, 2016

(51) Int. Cl.
*G06F 17/30* (2006.01)
*G06F 9/44* (2006.01)
*H04L 29/08* (2006.01)

(52) U.S. Cl.
CPC ...... *G06F 17/30194* (2013.01); *G06F 9/4411* (2013.01); *H04L 67/1097* (2013.01)

(58) Field of Classification Search
CPC ........... G06F 17/30194; G06F 17/3056; G06F 21/575; G06F 2221/034; G06F 2221/033; G06F 2221/575; G06F 9/4411; G06F 9/4406; G06F 9/4403; G06F 11/1417; G06F 11/1438; G06F 2009/45579; G06F 21/00; H04L 67/1097
See application file for complete search history.

(56) References Cited

U.S. PATENT DOCUMENTS

| 6,775,236 B1 | 8/2004 | Scrandis et al. |
| 8,219,792 B2 | 7/2012 | Jaber et al. |
| 8,356,194 B2 | 1/2013 | Carlson et al. |
| 8,423,718 B2 | 4/2013 | Tsai et al. |
| 8,589,902 B2 | 11/2013 | Jones et al. |
| 9,110,920 B1* | 8/2015 | Amegadzie ....... G06F 17/30238 707/E17.09 |

(Continued)

FOREIGN PATENT DOCUMENTS

EP  1 975 836 A2  10/2008

OTHER PUBLICATIONS

U.S. Appl. No. 13/912,330, filed Jun. 7, 2013.

*Primary Examiner* — Anh Ly
(74) *Attorney, Agent, or Firm* — Larson Newman, LLP

(57) ABSTRACT

An information handling system includes a processor and a memory including code to implement a Unified Extensible Firmware Interface (UEFI). The UEFI includes a UEFI network file system module that provides a first compound command to get directory information for a first directory on a network storage device, provides a second compound command to get file information for the first directory, and provides a third compound command to open a file stored on the first directory. The UEFI also includes a UEFI network protocol module that sends the first compound command, the second compound command, and the third compound command to the network storage device, wherein the first compound command, the second compound command, and the third compound command are sent to the network storage device via a first network transaction.

17 Claims, 5 Drawing Sheets

(56) References Cited

U.S. PATENT DOCUMENTS

| | | | |
|---|---|---|---|
| 2003/0140051 A1* | 7/2003 | Fujiwara | H04L 67/1097 707/E17.009 |
| 2007/0266027 A1* | 11/2007 | Gattegno | G06F 3/0605 707/E14.104 |
| 2008/0244257 A1 | 10/2008 | Vaid et al. | |
| 2009/0055607 A1* | 2/2009 | Schack | G06F 11/1435 711/162 |
| 2009/0271412 A1* | 10/2009 | Lacapra | G06F 17/30206 707/E17.032 |
| 2009/0327741 A1 | 12/2009 | Zimmer et al. | |
| 2011/0185203 A1 | 7/2011 | Carlson et al. | |
| 2013/0219380 A1 | 8/2013 | Rogers et al. | |
| 2015/0199147 A1* | 7/2015 | Goldberg | G06F 3/0644 711/170 |
| 2015/0280959 A1* | 10/2015 | Vincent | H04L 67/1097 709/203 |

* cited by examiner

OPTIMIZED UEFI FILE SYSTEM WITH NETWORK FILE SYSTEM COMPOUND STATEMENTS

FIELD OF THE DISCLOSURE

This disclosure generally relates to information handling systems, and more particularly relates to optimizing a Unified Extensible Firmware Interface (UEFI) file system with network file system compound statements.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A unified extensible firmware interface (UEFI) can provide an interface between the hardware and firmware of the information handling system and an operating environment of the information handling system. A UEFI operates to access a network using a network file system protocol such as a Network File System (NFS) protocol or a Common Internet File System (CIFS) protocol.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
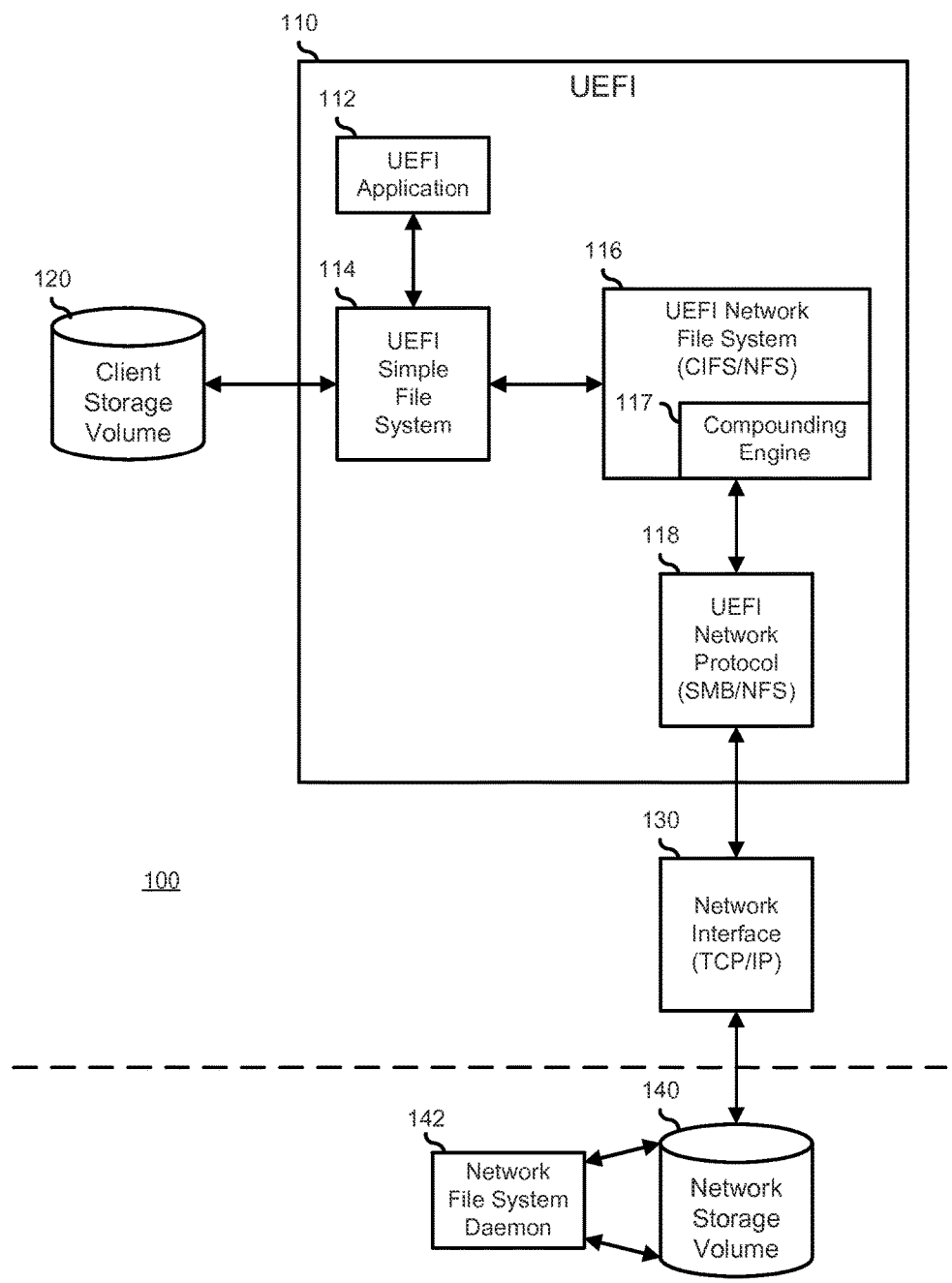
FIG. 1 is a block diagram of an information handling system according to an embodiment of the present disclosure.

FIG. 1 illustrates an information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 includes a UEFI 110 that operates on a processor complex of the information handling system to provide an interface between the hardware and firmware of the information handling system and an operating environment of the information handling system. In a particular embodiment, UEFI 110 is included in a UEFI memory that includes UEFI code for booting and operating information handling system 100. The UEFI memory can include a non-volatile random access memory (NV-RAM), such as a flash memory device. Information handling system 100 also includes a client storage volume 120, such as a hard disk drive or other data storage device for the information handling system, and a network interface 130 for providing a communication channel between the information handling system and a network storage volume 140.

UEFI 110 includes a UEFI application interface 112, a UEFI simple file system (SFS) module 114, a UEFI network file system module 116, and a UEFI network protocol module 118. UEFI network file system module 116 includes a compounding engine 117, described below. In operation, an application operating on information handling system 100 functions to perform an input/output (I/O) operation that results in a call to UEFI 110. For example, an application can make a call to UEFI to perform an I/O operation on client storage volume 120, on network storage volume 140, or on another I/O device of information handling system 100. When the application performs the I/O operation, the application makes a call to UEFI application interface 112, and the UEFI application interface directs the call to a functional module of UEFI 100. When the I/O operation is targeted to client storage volume 120 or to network storage volume 140, UEFI application module 112 directs the call to UEFI SFS module 114.

UEFI SFS module 114 translates the call from UEFI application interface 112 into one or more of a few simple I/O operation command. An example of a UEFI SFS command includes a FILE_OPEN command, a FILE_CLOSE command, a FILE_DELETE command, a FILE_READ command, a FILE_WRITE command, a FILE_GET_POSITION command, a FILE_SET_POSITION command, a FILE_GET_INFO command, a FILE_SET_INFO command, and a FILE_FLUSH command. The translated call is then forwarded to the target device of the I/O operation.

When the I/O operation is targeted to client storage volume 120, UEFI SFS module 114 forwards the translated call to the client storage volume. In particular, the translated call is directed to a driver associated with client storage volume 120 that operates to translate the UEFI SFS commands to commands associated with the particular file system used on the client storage volume. For example, where client storage volume 120 is partitioned as a File Allocation Table (FAT) storage volume, such as a FAT 32 storage volume or a FAT 64 storage volume, the driver translates the UEFI SFS commands into commands associated with the FAT protocol. Other file systems, such as NT File System (NTFS), are well known in the art, and include associated drivers for translating UEFI SFS commands. As such, drivers for client storage volume 120 will not be further disclosed herein.

When the I/O operation is targeted to network storage volume 140, UEFI SFS module 114 forwards the translated call to UEFI network file system module 116. UEFI network file system module 116 operates to allow access to files stored on network storage device 140, where the network storage device can access a network file system daemon 142 that is associated with the protocol used by UEFI network file system module 116. As such, UEFI network file system module 116 translates the UEFI SFS commands to commands associated with the particular protocol. An example of a protocol used by UEFI network file system module 116 includes a Network File System (NFS) protocol, a Common Internet File System (CIFS) protocol, or another network file system protocol, as needed or desired.

The UEFI network file system commands from UEFI network file system module 116 are provided to UEFI network protocol module 118 for translation into a network transmissible command. An example of a protocol used by UEFI network protocol module 118 includes a Server Message Block (SMB) protocol, a NFS protocol, or another network protocol, as needed or desired. The network transmissible command is provided to network interface 130 for encapsulation into a network packet, such as a Transmission Control Protocol (TCP) packet, an Internet Protocol (IP) packet, or another network packet, as needed or desired. The network packet is provided over a network to network storage volume 140, where the network packet is decapsulated and the embedded UEFI network file command is executed by network file system daemon 142 on the network storage volume. When network storage volume 140 executes the command, a reply is returned back through network interface 130, UEFI network protocol module 118, UEFI network file system module 116, UEFI SFS module 114, and back to UEFI application module 112 for transmission back to the application which originally made the I/O operation.

Figure 2:
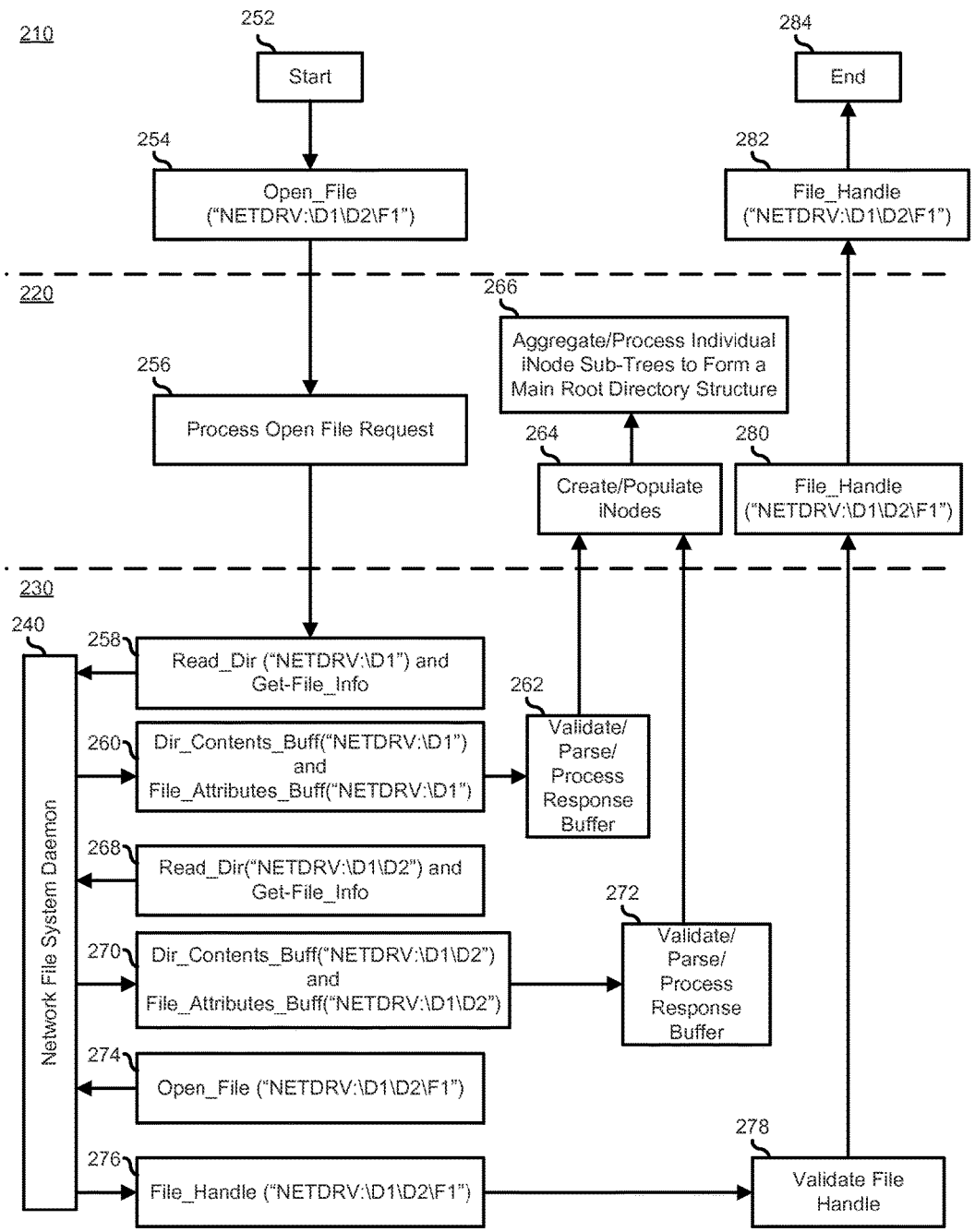
FIG. 2 is a block diagram illustrating an information handling system similar to the information handling system of FIG. 1, including an illustration of a flow for opening a file in an un-enumerated file directory according to an embodiment of the present disclosure.

FIG. 2 illustrates a UEFI 200 similar to UEFI 110, including a UEFI application interface 210 similar to UEFI application interface 112, a UEFI network file system module 220 similar to UEFI network file system module 116, and a UEFI network protocol module 230 similar to UEFI network protocol module 118, and that is connected via a network to a network file system daemon 240 similar to network file system daemon 142. UEFI 200 operates similarly to UEFI 110, such that an application operating on the information handling system that includes UEFI 200 functions to perform input/output (I/O) operations that result in calls to the UEFI.

FIG. 2 also illustrates a method for opening a file in an un-enumerated file directory. For example, when the information handling system that includes UEFI 200 is booted, as described below, the information handling system can make one or more network calls to open files that are stored remotely on the network, such as executable files, drivers, application program interfaces (APIs), and the like. When a particular file or directory on the network is first called, the information handling system can be unaware of the directory structure and director attributes, as well as the particular file attributes, and the information handling system will proceed to create an index node (inode) structure and populate the inode structure with the directory and file metadata that describes the particular directory structure. Thus, the method includes instructions for determining the metadata associated with the file structure, instructions for determining the metadata associated with the file, and instructions to open the file.

The method starts at block 252. In block 254, UEFI application interface 210 receives network operation to open a particular file. The operation includes a command, such as, (OPEN_FILE("NETDRV:\D1\D2\F1"), where OPEN_FILE represents the command to open a particular file, and "NETDRV:\D1\D1\F1" represents the file location and file name of the file, where NETDRV indicates that the file is on a network drive, :\D1\D2 indicates that the file is in the D2 subdirectory of the D1 subdirectory of the network drive, and F1 is the file name. UEFI application interface 210 passes a call to UEFI network file system 220 and the UEFI network file system processes the call in block 256. Note, the skilled artisan will recognize that the intermediate step of passing the call to a UEFI simple file system module is implied in the illustration of FIG. 2.

UEFI network file system module 220 processes the call into a series of commands, such as commands 258, 268, and 274, described below, that are forwarded to UEFI network protocol 230 for encapsulation and forwarding to network file system daemon 240. Network file system daemon 240 replies to each command by providing information, such as information 260, 270, and 276, described below, back to UEFI network protocol module 230 for further processing, as described below.

In particular, UEFI network file system module 220 issues command 258 to UEFI network protocol module 230. Command 258 includes the network file system sub-commands READ_DIR("NETDRV:\D1") and GET_FILE_CONTENTS. The READ_DIR sub-command is a direction to read the root directory (D 1) of the network drive (NETDRV), and the GET_FILE_CONTENTS sub-command retrieves the metadata from the root directory that describes the sub-directories off of the root directory and the files included in the root directory. Network file system daemon 240 receives command 258, reads the root directory and sends information 260 back to UEFI network protocol module 230. Information 260 includes DIR_CONTENTS_BUFF("NETDRV:\D1") and FILE_ATTRIBUTES_BUFF ("NETDRV:\D1") that together include the metadata for the root directory and the files included in the root directory. UEFI network protocol module 230 decapsulates information 260 and validates, parses, and otherwise processes the information included therein in block 262, and provides the validated, parsed and processed information to UEFI network file system module 220. UEFI network file system module 220 receives information 262 and creates and populates an inode structure in block 264, and the inode information is aggregated and processed by the UEFI network file system module to form a portion of the main root directory structure for the network drive in block 266.

Next, UEFI network file system module 220 issues command 268 to UEFI network protocol module 230. Command 268 includes the network file system sub-commands READ_DIR("NETDRV:\D1\D2") and GET_FILE_CONTENTS to read the sub-directory (D2) of the root directory (D1), and to retrieve the metadata from the sub-directory. Network file system daemon 240 receives command 268, reads the sub-directory and sends information 270 back to UEFI network protocol module 230.

Information 270 includes DIR_CONTENTS_BUFF ("NETDRV:\D1\D2") and FILE_ATTRIBUTES_BUFF ("NETDRV:\D1\D2") that together include the metadata for the sub-directory and the files included in the root directory. UEFI network protocol module 230 decapsulates information 270 and validates, parses, and otherwise processes the information included therein in block 272, and provides the validated, parsed and processed information to UEFI network file system module 220. UEFI network file system module 220 receives information 272 and creates and populates more of the inode structure in block 264, and the inode information is aggregated and processed by the UEFI network file system module to form the remainder of the directory structure for the network drive in block 266.

Finally, UEFI network file system module 220 issues command 274 to UEFI network protocol module 230. Command 274 includes the network file system sub-command OPEN_FILE("NETDRV:\D1\D2\F2") to open the file (F1). Network file system daemon 240 receives command 274, opens the file and sends information 276 back to UEFI network protocol module 230. Information 274 includes a file handle (FILE_HANDLE("NETDRV:\D1\D2\F1") for the file that is validated 278 by UEFI network protocol module 230 and forwarded to UEFI network file system module 220. UEFI network file system module 220 receives the file handle information 280 and passes the file handle information 282 to UEFI application interface 210, and the method ends in block 284.

The skilled artisan will recognize that other commands and transactions may be needed to read the contents of the file (F1), to close the file, or to otherwise gain access to the file, as needed or desired.

Returning to FIG. 1, UEFI network file system 116 includes a compounding engine 117 that combines network file system commands into compound commands which operate to transmit fewer network file system commands via the network to network file system daemon 142, but that convey the same request for information as would be provided by the command stream as shown in FIG. 2 or by other similar command streams that utilize the simple file system commands available to the UEFI network file system. The compound commands are received by network file system daemon 142 and the network file system daemon operates to provide a single reply to a compound command that conveys the same information as would be provided by the network file system daemon in response to the command stream as shown in FIG. 2. An example of a compound command includes a CMP_CMD_OPEN_FILE command, a CMP_CMD_CLOSE_FILE command, a CMP_CMD_READ_FILE command, a CMP_CMD_WRITE_FILE command, a CMP_CMD_GET_DIR_CONTENTS command, a CMP_CMD_SET_DIR_CONTENTS command, a CMP_CMD_GET_FILE_INFO command, a CMP_CMD_FILE_SET_INFO command, a CMP_CMD_GET_FILE_ATTRIB command, and a CMP_CMD_SET_FILE_ATTRIB command. In a particular embodiment, the compound commands operate to provide the designated operation on network storage volume 140 across multiple directories in the directory structure of the network storage volume or on multiple files within the directories.

Figure 3:
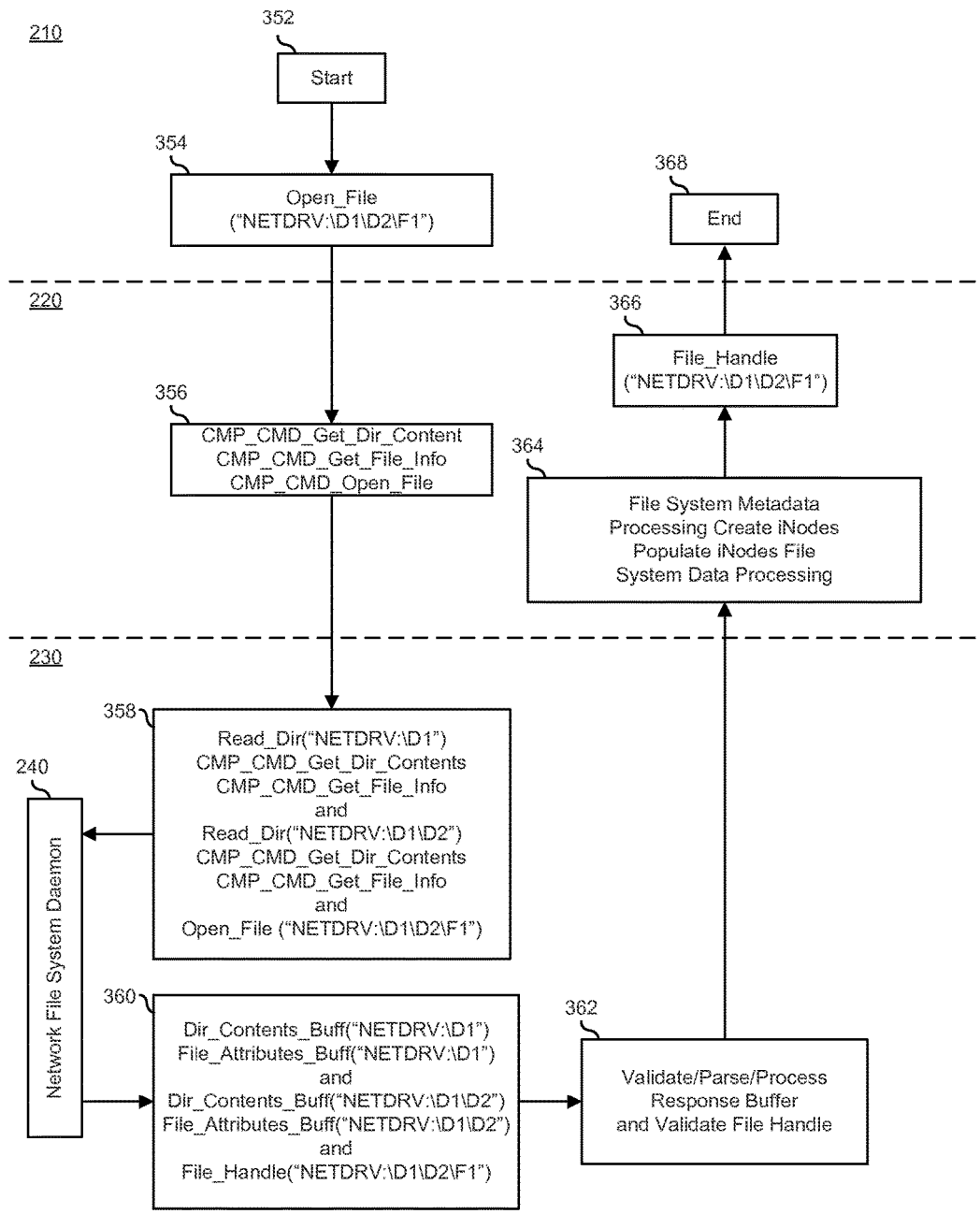
FIG. 3 illustrates the information handling system of FIG. 2, including an illustration of a flow for opening a file in an un-enumerated file directory according to another embodiment of the present disclosure.

FIG. 3 illustrates UEFI 200, and also illustrates a method for opening a file in an un-enumerated file directory using compound commands. The method starts at block 352. In block 354, UEFI application interface 210 receives network operation to open the file that includes the command, (OPEN_FILE("NETDRV:\D1\D2\F1"). UEFI application interface 210 passes a call to UEFI network file system 220 and the UEFI network file system processes the call in block 356. Here, UEFI network file system 220 processes the call into a single command 358 that includes a number of compound commands. Command 358 is forwarded to UEFI network protocol 230 for encapsulation and forwarding to network file system daemon 240. Network file system daemon 240 replies to the command by providing information 360, 270, and 276 back to UEFI network protocol module 230 for further processing, as described below.

In particular, UEFI network file system module 220 issues receives call 354 and translates the call into compound command 356 that includes the sub-commands READ_DIR ("NETDRV:\D1"), CMP_CMD_GET_DIR_CONTENTS, and CMP_CMD_GET_FILE_INFO for the root directory (D1), the sub-commands READ_DIR ("NETDRV:\D1\D2"), CMP_CMD_GET_DIR_CONTENTS, and CMP_CMD_GET_FILE_INFO for the sub-directory (D2), and the sub-command OPEN_FILE ("NETDRV:\D1\D2\F2"). UEFI network protocol module 230 encapsulates compound command 358 and sends the compound command via the network to network file system daemon 240. Network file system daemon 240 receives command 358, reads the root directory and the sub-directory and sends information 360 back to UEFI network protocol module 230. Information 360 includes DIR_CONTENTS_BUFF ("NETDRV:\D1"), FILE_ATTRIBUTES_BUFF("NETDRV:\D1"), DIR_CONTENTS_BUFF ("NETDRV:\D1\D2"), FILE_ATTRIBUTES_BUFF("NETDRV:

\D1\D2"), and FILE_HANDLE("NETDRV:\D1\D2\F1" that together include the metadata for the entire directory structure, the files included in the directories, and the file handle. UEFI network protocol module 230 decapsulates information 360 and validates, parses, and otherwise processes the information included therein in block 362, and provides the validated, parsed and processed information to UEFI network file system module 220. UEFI network file system module 220 receives information 362 and creates and populates the inode structure and aggregates and processes the inode information to form the directory structure for the network drive in block 364. UEFI network file system module 220 passes the file handle information 366 to UEFI application interface 210, and the method ends in block 368.

Note that, by compounding commands in UEFI network file system module 220, the number of network transactions between UEFI network protocol module 230 and network file system daemon 240 is reduced to one transaction and one reply, that the post processing by UEFI network protocol module of replies is reduced to one post-processing step, block 362, and that the aggregating an processing of the inode structure is performed in a single operation in UEFI network file system module 220. The skilled artisan will recognize that the command streams illustrated in FIGS. 2 and 3 are representative of a wide variety of network file operations that can be performed, using either the simple file system commands available to the UEFI network file system 220, or using the compound file system commands. For example, similar file system operations, such as file reads, file writes, listing of files, reading file attributes, writing file attributes, or the like, can be performed using either the simple file system commands or the compound files system commands.

Figure 4:
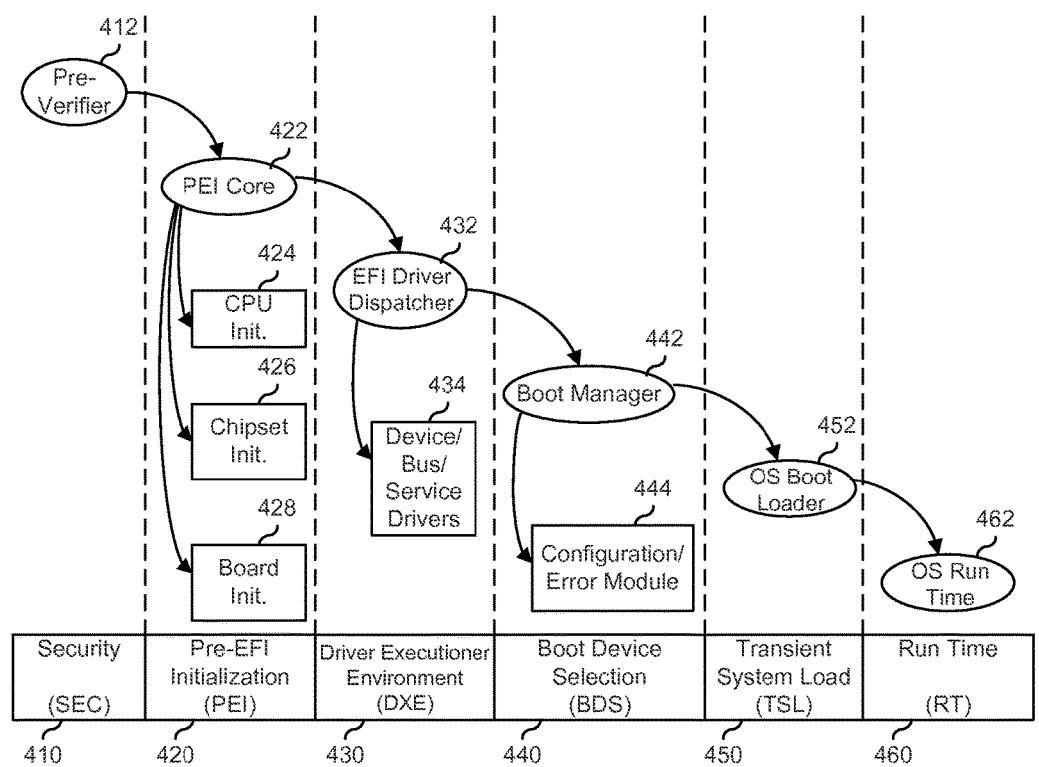
FIG. 4 is a phase diagram for a UEFI boot of the information handling system of FIG. 1.

FIG. 4 illustrates a phase diagram 400 for an information handling system that operates using a UEFI, including a security phase (SEC) 410, a pre-EFI initialization phase (PEI) 420, a driver execution environment phase (DXE) 430, a boot device selection phase (BDS) 440, a transient system load phase (TSL) 450, and a run time phase (RT) 460. SEC 410 is the first phase of a UEFI boot process on the information handling system that operates to set up a pre-verifier 412. Pre-verifier 412 handles all restart events on the information handling system, and temporarily allocates a portion of memory for use during the other boot phases. SEC 410 is executed out of the firmware resident on the information handling system, and so serves as a root of trust for the system.

SEC 410 passes execution to PEI 420 which initializes the system memory for the information handling system. PEI 420 sets up a PEI core 422 that includes CPU initialization 424, chipset initialization 426, and board resource initialization 428. PEI 420 passes execution to DXE 430 which performs device specific initializations for the information handling system. In particular, DXE 430 executes an EFI driver dispatcher 432 that operates to load device, bus, and service drivers 434. DXE 430 passes execution to BDS 440 which executes a boot manager 442 that includes a configuration/error module 444 that operates as described above. In a particular embodiment, a configuration/error module similar to configuration/error module 434 operates in DXE330. Boot manager 442 also identifies a boot target, and passes execution to TSL 450. TSL 450 launches an OS boot loader 452 which loads the operating system, and passes execution to the operating system at RT 460.

Figure 5:
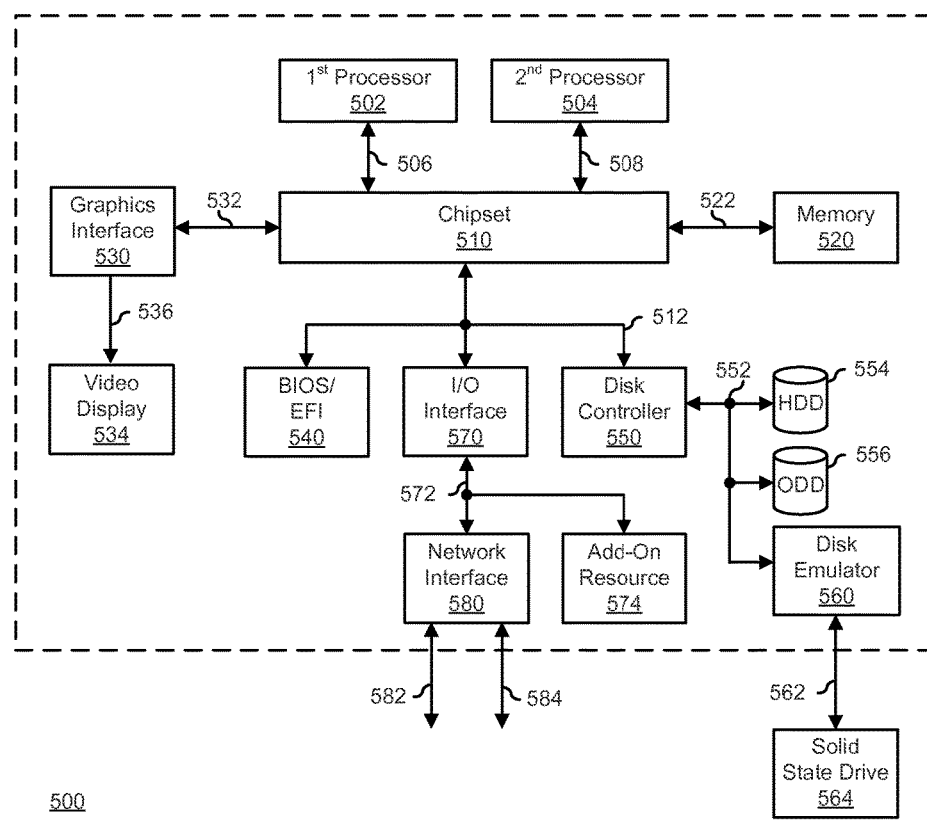
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a processor; and
a memory including code to implement a Unified Extensible Firmware Interface (UEFI), the UEFI including:
a UEFI network file system module that:
receives a file call to open a file stored in a first directory on a network storage device, and in response to receiving the file call, the UEFI network file system further;
provides a first input/output (I/O) operation command to get directory information for the first directory on the network storage device;
provides a second I/O operation command to get file information for the first directory; and
provides a third I/O operation command to open the file stored on the first directory; and
a UEFI network protocol module that;
combines the first I/O operation command, the second I/O operation command, and the third I/O operation command into a compound command: and
sends the compound command to the network storage device, wherein the compound command is sent to the network storage device via a first network transaction.

2. The information handling system of claim 1, wherein the file call is received from a UEFI application interface of the information handling system.

3. The information handling system of claim 1, wherein the UEFI network protocol module receives the directory information, the file information, and a file handle for the file in response to sending the first network transaction.

4. The information handling system of claim 3, wherein the UEFI network protocol module further receives the directory information, the file information, and the file handle via a second network transaction.

5. The information handling system of claim 3, wherein:
the UEFI network protocol module provides the directory information, the file information, and the file handle to the UEFI network file system module; and
the UEFI network file system module populates an index node structure based upon the directory information and the file information.

6. The information handling system of claim 3, wherein:
the first directory is a sub-directory of a root directory of the network storage device;
the directory information includes root directory information from the root directory and sub-directory information from the sub-directory; and
the file information includes root file information from the root directory and sub-directory file information from the sub-directory.

7. The information handling system of claim 3, wherein the UEFI network protocol module:
sends the compound command to a network file system daemon of the network storage device; and receives the directory information, the file information, and a file handle from the network file system daemon.

8. The information handling system of claim 1, wherein:
the first I/O operation command operates to get the directory information for the first directory and for a second directory that includes the first directory; and
the second I/O operation command operates to get the file information for the first directory and for the second directory.

9. A method comprising:
receiving, by a Unified Extensible Firmware Interface (UEFI) network file system module of an information handling system, a first call to open a file stored in a first directory on a network storage device;
providing, by the UEFI network file system in response to receiving the first call, a first input/output (I/O) operation command to get directory information for a first directory on a network storage device;
providing, by the UEFI network file system module in response to receiving the file call, a second I/O operation storage command to get file information for the first directory;
providing, by the UEFI network file system module in response to receiving the first call, a third I/O operation command to open the file stored on the first directory;
receiving, by a UEFI network protocol module, the first I/O operation command, the second storage command, and the third I/O operation command;
combining the first I/O operation command, the second I/O operation command, and the third I/O operation command into a compound command: and
sending, by the UEFI network protocol module, the compound command to the network storage device, wherein the compound command is sent to the network storage device via a first network transaction.

10. The method of claim 9, wherein the file call is received from a UEFI application interface of the information handling system.

11. The method of claim 9, further comprising:
receiving, by the UEFI network protocol module, the directory information, the file information, and a file handle for the file in response to sending the first network transaction.

12. The method of claim 11, further comprising:
receiving, the directory information, the file information, and the file handle via a second network transaction.

13. The method of claim 11, further comprising:
providing, by the UEFI network protocol module, the directory information, the file information, and the file handle to the UEFI network file system module; and populating, by the UEFI network file system module, an index node structure based upon the directory information and the file information.

14. The method of claim 11, wherein:
the first directory is a sub-directory of a root directory of the network storage device;
the directory information includes root directory information from the root directory and sub-directory information from the sub-directory; and
the file information includes root file information from the root directory and sub-directory file information from the sub-directory.

15. The method of claim 11, further comprising:
sending, by the UEFI network protocol module, the first I/O operation command, the second I/O operation command, and the third I/O operation command to a network file system daemon of the network storage device; and
receiving, from the network file system daemon, the directory information, the file information, and a file handle.

16. A non-transitory computer-readable medium including code for performing a method, the method comprising:
receiving, by a Unified Extensible Firmware Interface (UEFI) network file system module of an information handling system, a file call to open a file stored in a first directory on a network storage device;
providing, by the UEFI network file system in response to receiving the file call, a first input/output (I/O) operation command to get directory information for the first directory on a network storage device;
providing a second I/O operation command to get file information for the first directory;
providing a third I/O operation command to open a file stored on the first directory;
receiving, by a UEFI network protocol module, the first I/O operation command, the second I/O operation command, and the third I/O operation command;
combining the first I/O operation command, the second I/O operation command, and the third I/O operation command into a compound command; and
sending the compound command to the network storage device, wherein the compound command is sent to the network storage device via a first network transaction.

17. The computer-readable medium of claim 16, the method further comprising:
receiving the directory information, the file information, and a file handle for the file in response to sending the first network transaction.

* * * * *